United States Patent
Huang et al.

(10) Patent No.: US 6,933,776 B2
(45) Date of Patent: Aug. 23, 2005

(54) SIGNAL DEMODULATING METHOD OF A TWO-PHASE FREQUENCY SHIFT KEYING (FSK) DIGITAL DEMODULATOR

(75) Inventors: Jen-Sheng Huang, Hsinchu (TW); Yaw-Guang Chang, Hsinchu (TW); Li-Cheng Hsu, Hsinchu (TW); Jinn-Ja Chang, Hsinchu (TW)

(73) Assignee: Terax Communication Technologies Inc., Hsinchu (TW)

( * ) Notice: Subject to any disclaimer, the term of this patent is extended or adjusted under 35 U.S.C. 154(b) by 116 days.

(21) Appl. No.: 10/390,002

(22) Filed: Mar. 18, 2003

(65) Prior Publication Data
US 2004/0183590 A1 Sep. 23, 2004

(51) Int. Cl.[7] ................................................. H03D 3/00
(52) U.S. Cl. ........................ 329/300; 329/303; 375/334; 375/335
(58) Field of Search ................................. 329/300, 303; 375/334, 335

(56) References Cited

U.S. PATENT DOCUMENTS 4,707,666 A * 11/1987 Pfeifer et al. ................ 329/343

* cited by examiner

*Primary Examiner*—Arnold Kinkead
(74) *Attorney, Agent, or Firm*—Rosenberg, Klein & Lee

(57) ABSTRACT

There is provided a signal demodulating method of a two-phase frequency shift keying (FSK) digital demodulator. The method utilizes at least a detect circuit respectively detecting and collecting a positive edge signal and a negative edge signal of an intermediate frequency signal. Then, two n-bit ripple counters are utilized to refer to a threshold value and then receiving the positive and negative edge signal as a switch signal to reset the threshold value as an initial value of counters so as to start to count and compare to output a positive edge data bit and a negative edge data bit. Last, a hard decision logic circuit is used to perform a frequency-descending decision in accordance with the positive and negative edge data bit so as to send a base frequency signal. The method can decrease the logic gate counts, shorten the signal delay time, and increase the resolution of the demodulation. The present invention allows for; easy and practical signal demodulating method results, which can match the compact trend of the wireless products.

12 Claims, 2 Drawing Sheets

SIGNAL DEMODULATING METHOD OF A TWO-PHASE FREQUENCY SHIFT KEYING (FSK) DIGITAL DEMODULATOR

BACKGROUND OF THE INVENTION

1. Field of the Invention

The present invention generally relates to a signal demodulating technology of a digital wireless communication transceiver module, and more particularly relates to a two-phase frequency shift keying (FSK) digital demodulator apply to the intermediate frequency (IF) frequency shift keying (FSK).

2. Description of the Prior Art

Recently, the development of the communication products is increasingly improved and the Internet is more and more commonly used. The emergency of the information technology (IT) household appliances and the use of the wireless communication, the digital broadcasting; and the broadband network have proved the coming of the IT century as well as leading to information transmission accurring more promptly and diverse, in order to match the increasing requirement of the IT products, the personal wireless communication technology becomes the attention-getting star in the recent years and the requirement of the wireless products is respectively enhanced.

In the wireless communication products, the radio frequency/intermediate frequency module is composed of the wireless transceiver unit, the signal composing unit, and the wireless emitting unit. Wherein the transceiver unit utilizes the radio frequency head, the mixer, the intermediate frequency amplifier, the demodulator, and other circuits for eliminating the interference signal or automatically gaining modulation. Basically, after amplifying, wave filtering, and composing the signal, which is received by the radio frequency/intermediate frequency module, the demodulator is utilized to demodulate and return the intermediate frequency to the original base frequency so as to use for the following process of the base frequency. Hence, the demodulator is an important part in the digital wireless communication transceiver module.

In the prior art, when the FSK demodulator of the modulation technology is utilized to perform the modulation of the intermediate frequency, a mixer is firstly utilized to perform the first frequency-descending to lower the intermediate frequency into a signal with a high Q value. Then, the signal is calculated via the complex calculating formula internally designed, such that the signal can be demodulated into the base frequency. Prior method will cause increasing the signal delaying time and the occupied counts of the logic gate counts. In addition, the RTL digital design circuit adopted by the prior FSK demodulator requires a larger chip area and the current consumption is correspondingly increased.

Hence, the main spirit of the invention is to provide a signal demodulating method of a two-phase frequency shift keying (FSK) digital demodulator, and then some disadvantages of well-known technology are overcome.

SUMMARY OF THE INVENTION

The primary object of the present invention is to provide a signal demodulating method of a two-phase frequency shift keying (FSK) digital demodulator, which utilizes the two-phase application to perform the demodulation of the signal so that the present invention can increase the resolution while intermediate frequency demodulating and provide an outstanding effect for applying to the lowering of the intermediate frequency.

Another object of the present invention is to provide a signal demodulating method of a two-phase frequency shift keying (FSK) digital demodulator, which can decrease the logic gate counts and shorten the signal delay time so as the present invention can effectively decrease the electric current consumption.

A further object of the present invention is to provide an easy and practical signal demodulating method of a two-phase frequency shift keying (FSK) digital demodulator, which can decrease the chip area so as the demodulator can provide the advantages of small architecture, area-saving and to match the compact trend of the wireless products.

A furthermore object of the present invention is to provide a signal demodulating method of a two-phase frequency shift keying (FSK) digital demodulator, is provides with the function of the signal compensation so as the present invention can increasingly decrease the frequency deviation.

In order to achieve previous objects, the present invention utilizes at least a detect circuit respectively detecting and collecting a positive edge signal and a negative edge signal of an intermediate frequency signal. Then, a first n-bit ripple counter and a second n-bit ripple counter are utilized to simultaneously refer to a threshold value and respectively to perform the counting and comparing process with the positive edge signal interval and the negative edge signal interval so as to output a positive edge data bit and a negative edge data bit. Last, a hard decision logic circuit is utilized to perform a frequency-descending decision in accordance with the positive edge data bit and the negative edge data bit so as to send a base frequency signal. Besides, the present invention utilizes a positive or negative edge data bit compensation signal to the hard decision logic circuit to perform signal-compensating when a positive edge signal interval or negative edge signal interval is too large so as the first counter can obtain the positive edge data bit without completely counting overall the positive edge signal interval or negative edge signal interval.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention utilizes a pair of counters to perform the processing of a two-phase signal of a intermediate frequency (IF) and to perform the demodulation of the signal via the two-phase positive edge signal and negative edge signal so as to achieve reducing the logic gate counts, shortening the signal delay time, and improving the demodulation resolution. More particularly, in the application of the low IF of the present invention, the effect is more remarkable.

Figure 1:
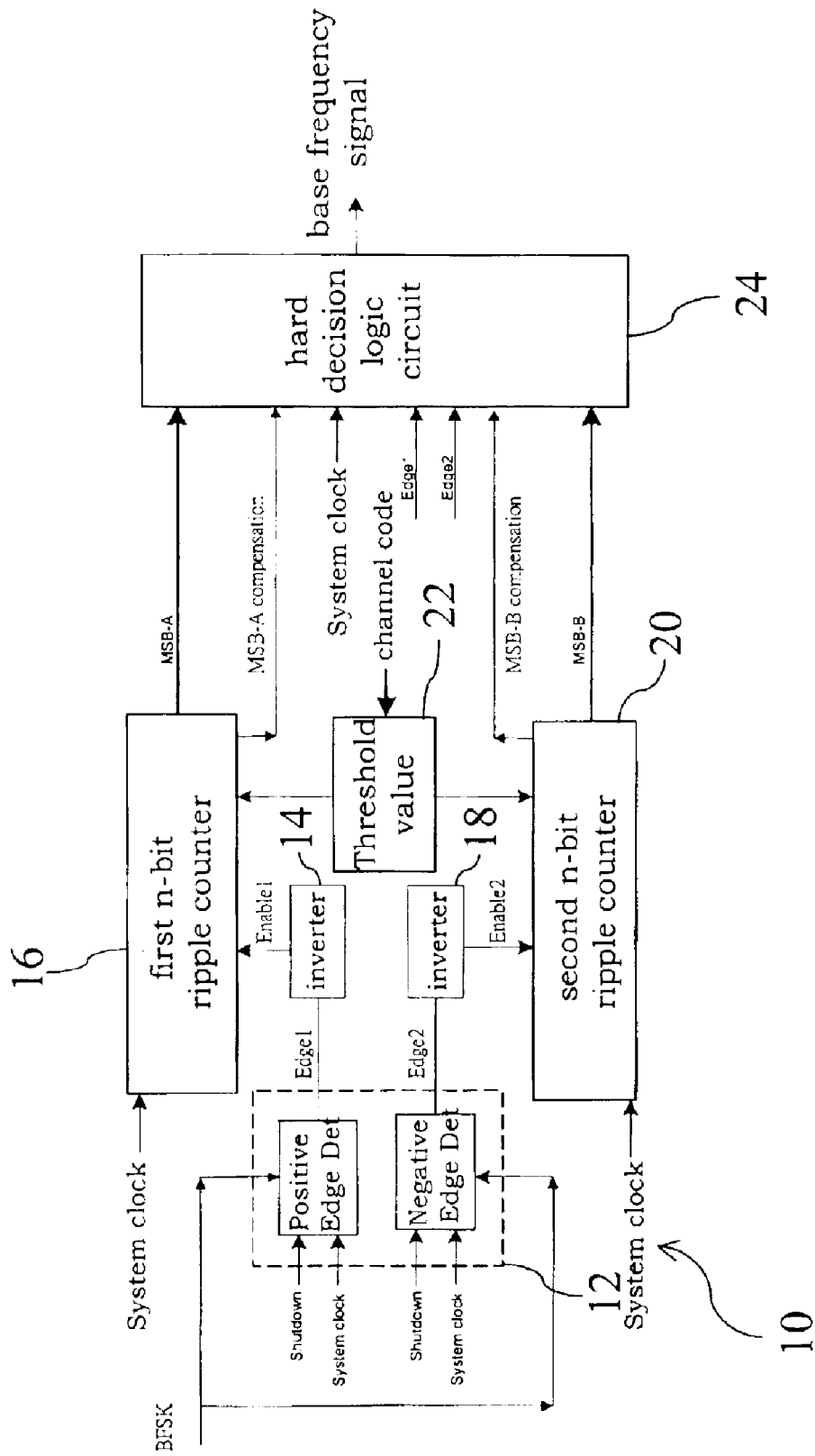
FIG. 1 is a schematic representation of the architecture of the two-phase frequency shift keying (FSK) digital demodulator, in accordance with the present invention.

The two-phase FSK digital demodulator and its signal demodulating method provided by the present invention can simultaneously refer to the FIG. 1, which is used to explain the whole architecture of the two-phase FSK digital demodulator and the procedure of performing the signal demodulation. When the wireless transceiver unit has received a wireless radio frequency signal, a FSK IF signal is transferred to a two-phase FSK digital demodulator after the process of amplifying, wave filtering, and composing via elements of the mixer, the intermediate frequency amplifier, and the demodulator.

Figure 2:
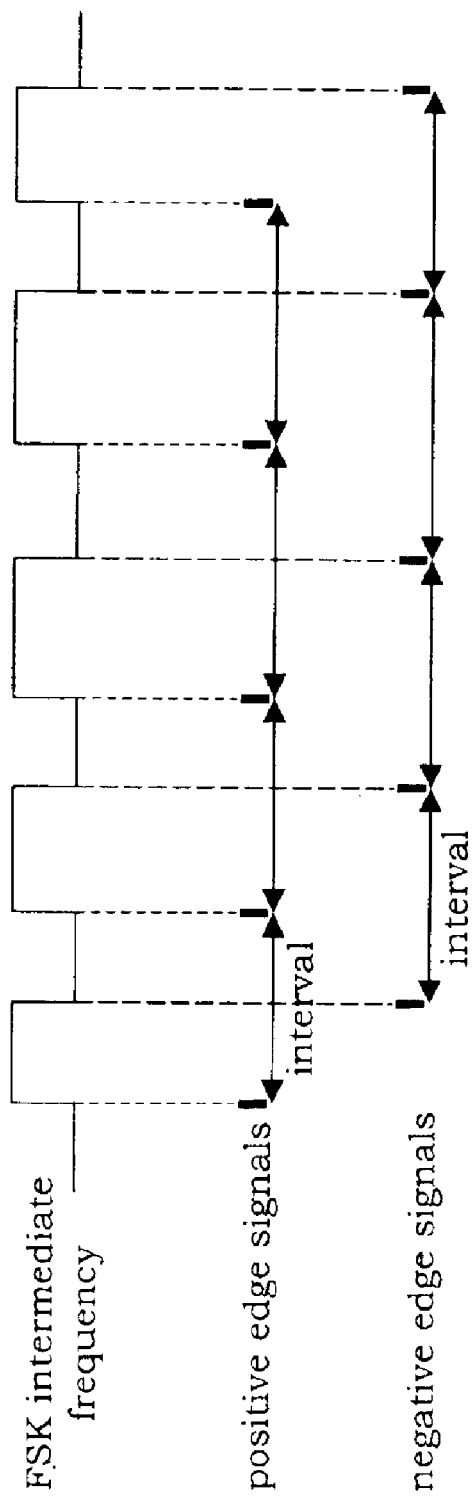
FIG. 2 is a schematic representation of the waveform signal, in accordance with the present invention.

Referring to the FIG. 1, in the present invention, when a two-phase FSK digital demodulator 10 receives the FSK IF signal, at least a detect circuit 12 is firstly used to detect and collect a positive edge signal, which is positive edge-to-positive edge, and a negative edge signal, which is negative edge-to-negative edge, simultaneously referring to the schematic representation of the waveform signal of the FIG. 2. After the detect circuit 12 collects the positive edge signal, an inverter 14 is used to reverse the positive edge signal. Then the signal is used to transfer a signal into the first n-bit ripple counter 16 as switch signal to reset a threshold value 22 as an initial value of the first n-bit ripple counter 16 (using the complement of two i.e. the minus). At the same time, after the detect circuit 12 collects the negative edge signals, an inverter 18 is used to reverse the negative edge signal. Then the signal is used to transfer a signal into the second n-bit ripple counter 20 as switch signal to reset a threshold value 22 as an initial value of the second n-bit ripple counter 20. Wherein, the threshold value 22 provides with different corresponding value in accordance with the different channel code.

Before performing the counting, a system clock is used to respectively to calculate the distance between adjacent positive edge signals to obtain a positive edge signal interval and simultaneously to calculate the distance between adjacent negative edge signals to obtain a negative edge signal interval. At this time, after resetting the threshold value 22 as the initial value of the first n-bit ripple counter 16, the counting comparison is performed by matching the positive edge signal interval to output a positive edge data bit, which is the most significant bit (BIT) of the n-bit ripple counter of a binary bit with 1 or 0. If the positive edge signal interval is larger than the threshold value 22, an output of the positive edge data bit is 0; and if the positive edge signal interval is smaller than the threshold value 22, an output of the positive edge data bit is 1. Wherein, the present invention can utilize a positive edge data bit compensation signal to a hard decision logic circuit 24 to perform signal-compensating when the positive edge signal interval is too large so as the first n-bit ripple counter 16 can obtain the positive edge data bit without completely counting overall positive edge signal interval.

At the same time of the first n-bit ripple counter 16 performing the counting, after resetting the threshold value 22 as the initial value of the second n-bit ripple counter 20, the counting comparison is performed by matching the negative edge signal interval to output a negative edge data bit, which is the most significant bit (MSB) of the n-bit ripple counter of a binary bit with 1 or 0. If the negative edge signal interval is larger than the threshold value 22, an output of the negative edge data bit is 0; and if the negative edge signal interval is smaller than the threshold value 22, an output of the negative edge data bit is 1. Wherein, the present invention can utilize a negative edge data bit compensation signal to a hard decision logic circuit 24 to perform signal-compensating when the negative edge signal interval is too large so as the second n-bit ripple counter 20 can obtain the negative edge data bit without completely counting overall negative edge signal interval.

When the negative edge data bit and the negative edge data bit counted by the first n-bit ripple counter 16 and the second n-bit ripple counter 20 are simultaneously transferred to the hard decision logic circuit 24, a frequency-descending decision is performed in accordance with the positive edge data bit and the negative edge data bit and to simultaneously perform the signal compensation by matching the positive edge data bit compensation signal and the negative edge data bit compensation signal so as to send a base frequency. Hence, the hard decision logic circuit 24 can simultaneously decide via the positive edge data bit compensation signal and the negative edge data bit compensation signal to enhance the accuracy of the demodulated base signal and so as to increasingly reduce the frequency deviation.

To sum up the forgoing, the present invention can save an additional logic gate count of the multi-bit comparator of the prior art. In the signal compensation, if the distance of the interval between adjacent positive edge signal or the distance of the interval between adjacent negative edge signal is too large, it will reduce the resolution of the hard decision logic circuit. Hence, the present invention can perform the signal compensation in the hard decision logic circuit 24 by utilizing the positive edge data bit compensation signal and the negative edge data bit compensation signal to obtain the positive edge data bit and the negative edge data bit without completely counting overall signal interval.

Hence, the present invention utilizes the two-phase application to perform the demodulation of the signal so as the present invention can increase the resolution while intermediate frequency demodulating and simultaneously decrease the logic gate counts and shorten the signal delay time so as the present invention can effectively decrease the electric current consumption. Besides, the present invention serves to provide an easy and practical signal demodulating method of a two-phase frequency shift keying (FSK) digital demodulator, which can decrease the chip area so as the demodulator can provide with the advantages of small architecture, area-saving and to match the compact trend of the wireless products.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A signal demodulating method of a two-phase frequency shift keying (FSK) digital demodulator, wherein said two-phase FSK digital demodulator receives an intermediate frequency (IF) signal, which is amplified, wave filtered, and synthesized, and then performs a demodulating step, said signal demodulating method comprising the following steps:

detecting and collecting a positive edge signal and a negative edge signal of said intermediate frequency signal;

selecting a corresponding threshold value in accordance with a different channel code and then receiving said positive edge signal as a switch signal to reset said threshold value as an initial value to start to count and compare to obtain a positive edge data bit;

receiving said negative edge signal as a switch signal to reset said threshold value as an initial value to start to count and compare to obtain a negative edge data bit; and performing a frequency-descending decision step in accordance with said positive edge data bit and said negative edge data bit so as to send a base frequency signal.

2. The signal demodulating method according to claim 1, after the step of detecting and collecting said positive edge signal, further comprises a step of reversing said positive edge signal and then performing the counting and comparing step.

3. The signal demodulating method according to claim 1, after the step of detecting and collecting said negative edge signal, further comprises a step of reversing said negative edge signal and then performing the counting and comparing step.

4. The signal demodulating method according to claim 1, further comprising a step of calculating a positive edge signal interval and a negative edge signal interval utilizing a system clock to calculate said interval.

5. The signal demodulating method according to claim 1, further comprising steps of counting a positive edge signal interval and a negative edge signal interval respectively utilizing two n-bit ripple counters.

6. The signal demodulating method according to claim 1, wherein said frequency-descending decision step is performed in a hard decision logic circuit.

7. The signal demodulating method according to claim 1, comprises a step of utilizing a positive edge data bit compensation signal to perform a signal-compensating step when a positive edge signal interval is too large so as to obtain said positive edge data bit without completely counting overall positive edge signal interval.

8. The signal demodulating method according to claim 1, comprises a step of utilizing a negative edge data bit compensation signal to perform a signal-compensating step when a negative edge signal interval is too large so as to obtain said negative edge data bit without completely counting overall negative edge signal interval.

9. The signal demodulating method according to claim 1, wherein said positive edge data bit and said negative edge data bit are a binary bit with 1 or 0.

10. The signal demodulating method according to claim 1, after the step of counting and comparing, if a positive edge signal interval is larger than said threshold value, an output of said positive edge data bit is 0; and if said positive edge signal interval is smaller than said threshold value, an output of said positive edge data bit is 1.

11. The signal demodulating method according to claim 1, after the step of counting and comparing, if a negative edge signal interval is larger than said threshold value, an output of said negative edge data bit is 0; and if said negative edge signal interval is smaller than said threshold value, an output of said negative edge data bit is 1.

12. The signal demodulating method according to claim 1, wherein an output of said positive edge data bit of a first counter and an output of said negative edge data bit of a second counter are a most significant bit (MSB).

* * * * *